US011729516B2

(12) United States Patent
Reusen et al.

(10) Patent No.: US 11,729,516 B2
(45) Date of Patent: Aug. 15, 2023

(54) METHOD OF DIGITALLY PROCESSING AN IMAGE AND METHOD OF DIGITALLY PROCESSING A PLURALITY OF PIXELS

(71) Applicant: Melexis Technologies NV, Tessenderlo (BE)

(72) Inventors: Wouter Reusen, Tessenderlo (BE); Adrian Hill, Novi, MI (US); Luc Buydens, Tessenderlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 17/667,646

(22) Filed: Feb. 9, 2022

(65) Prior Publication Data
US 2022/0256079 A1 Aug. 11, 2022

(30) Foreign Application Priority Data
Feb. 10, 2021 (EP) .................................... 21156372

(51) Int. Cl.
*H04N 23/80* (2023.01)
*H04N 25/44* (2023.01)

(52) U.S. Cl.
CPC ............. *H04N 23/80* (2023.01); *H04N 25/44* (2023.01)

(58) Field of Classification Search
CPC ..... H04N 5/23229; H04N 5/345; G06T 5/003
See application file for complete search history.

(56) References Cited

U.S. PATENT DOCUMENTS

| 8,098,948 B1 * | 1/2012 | Tzur ....................... H03F 3/217 |
| | | 382/255 |
| 9,875,556 B2 | 1/2018 | McNally |
| 10,186,020 B2 | 1/2019 | Engberg et al. |
| 2019/0102870 A1 * | 4/2019 | Tokizaki ................ H04N 5/332 |

FOREIGN PATENT DOCUMENTS

| CN | 107862670 A | 3/2018 |
| EP | 2908266 A1 | 8/2015 |

OTHER PUBLICATIONS

European Search Report for European patent Application No. 21156372 dated Jul. 28, 2021.

* cited by examiner

*Primary Examiner* — Ahmed A Berhan
(74) *Attorney, Agent, or Firm* — Harness, Dickey & Pierce, P.L.C.

(57) ABSTRACT

A method of digitally processing an image comprises: generating an intensity distribution model (170) in respect of at least a portion of the array of sensing pixels (102) of a detector device (100). The array of sensing pixels comprises clusters of pixels. A pixel (140) from the array of sensing pixels is then selected (202) and a first distance and a second distance from the selected pixel to a first neighbouring pixel (142) and a second neighbouring pixel (144), respectively, are determined (402) and the intensity distribution model (170) referenced (406) by the first distance is used to calculate a first weight and a second weight to apply to the first and second neighbouring pixels, respectively. The first distance comprises an intra-cluster distance and the second distance comprises an inter-cluster distance, the intra-cluster distance being different from the inter-cluster distance. The first weight is applied (214) to the first neighbouring pixel (142) and the second weight is applied (214) to the second neighbouring pixel (144).

15 Claims, 6 Drawing Sheets

METHOD OF DIGITALLY PROCESSING AN IMAGE AND METHOD OF DIGITALLY PROCESSING A PLURALITY OF PIXELS

FIELD

The present invention relates to a method of digitally processing an image, the method being of the type that, for example, selects a pixel and applies weights to intensity values of neighbouring pixels. The present invention also relates to a method of digitally processing a plurality of pixels, the method being of the type that, for example, models intensities of pixels.

BACKGROUND

In the field of optical detection, an optical detector device typically comprises a die packaged within a housing. The die comprises a plurality of detector elements constituting pixels. A light-receiving side of the die is disposed opposite an aperture provided in the housing and a lens is disposed within the aperture to form a window.

In operation, light received by the detector elements is translated from the optical domain to the electrical domain. However, positioning of the lens during manufacture is prone to inaccuracy, which in turn leads to a mismatch between the distance between the lens and the die and the focal length of the lens. Consequently, received light incident upon the lens is diffused over multiple neighbouring pixels of the die. If left untreated, a resulting image has a blurred appearance. This blurring can be considered equivalent to application of a filter, for example by convolution, which is usually undesirable and sometimes referred to as undesirable convolution.

In order to attempt to mitigate the blurring that takes place, it is known to apply a so-called kernel to the output of the pixels by way of a deconvolution process. However, such deconvolution is not completely successful, and some blurring nevertheless remains in the image post-treatment with the kernel.

Chinese patent publication CN107862670 relates to a system to minimise cross-talk, and discloses an infrared image restoration process using a point spread function. However, the process disclosed suffers from the suboptimal removal of blurring described above.

U.S. Pat. No. 10,186,020 relates to intensity adjustment based on neighbouring pixel values, and discloses a method to preserve edges and correct incorrect values based on the neighbourhood information. However, as in the case of the system to minimise cross-talk, the intensity adjustment technique disclosed similarly suffers from the suboptimal removal of blurring described above.

U.S. Pat. No. 9,875,556 relates to an image correction technique. When up-sampling an image to a higher resolution, the image correction technique comprises calculating the value of the pixel being up-sampled based upon neighbouring pixel values weighted using a kernel. However, the process disclosed also suffers from the suboptimal removal of blurring described above.

SUMMARY

According to a first aspect of the present invention, there is provided a method of digitally processing an image captured using an array of sensing pixels of a detector device, the method comprising: generating an intensity distribution model in respect of at least a portion of the array of sensing pixels; selecting a pixel from the array of sensing pixels, the array of sensing pixels comprising clusters of pixels; determining a first distance from the selected pixel to a first neighbouring pixel and using the intensity distribution model referenced by the first distance to calculate a first weight to apply to the first neighbouring pixel; determining a second distance from the selected pixel to a second neighbouring pixel and using the intensity distribution model referenced by the second distance to calculate a second weight to apply to the second neighbouring pixel; wherein the first distance comprises an intra-cluster distance and the second distance comprises an inter-cluster distance, the intra-cluster distance being different from the inter-cluster distance; and applying the first weight to the first neighbouring pixel; and applying the second weight to the second neighbouring pixel.

The intensity distribution model may model variation of intensity with angle of incidence with respect to a notional pixel; and the method may further comprise: translating the first distance to a first corresponding angle of incidence; and determining a first intensity from the model using the first corresponding angle of incidence.

The method may further comprise: translating the second distance to a second corresponding angle of incidence; and determining the second intensity from the model using the second corresponding angle of incidence.

The intensity distribution model may model variation of intensity with angle of incidence with respect to a notional pixel.

The angle of incidence may be linearly related to a distance from a peak of the model.

A distance between the notional pixel and a neighbouring pixel may be: $c \times p_o + d \times p_i$, where $p_o$ may be an inter-cluster distance and $p_i$ may be an intra-cluster distance, and c and d may be constants.

The intensity distribution model may model variation of intensity with distance.

The intensity distribution model in respect of the at least a portion of the array of sensing pixels may be in respect of a notional pixel and a predetermined number of pixels peripheral to the notional pixel.

The intensity distribution model may comprise normalised intensity values.

The intensity distribution model may be a point spread function.

The method may further comprise: generating a kernel using the first weight and the second weight.

The method may further comprise: deconvolving a pixel of the array of pixels with the kernel.

The method may further comprise: generating another kernel using different weights; and deconvolving another pixel of the array of pixels using the another kernel.

The method may further comprise: generating a set of kernels, each kernel of the set of kernels respectively corresponding to a different pixel index of a predetermined cluster pattern of pixels in the array of sensing pixels, the predetermined cluster pattern repeating throughout the array of sensing pixels; separately applying each kernel of the set of kernels as a deconvolution filter to the captured image to yield a set of deconvolved images, respectively corresponding to each pixel index of the predetermined cluster pattern; selecting a plurality of processed pixels respectively from each deconvolved image of the set of deconvolved images, each plurality of the plurality of processed pixels selected respectively corresponding to the each pixel index of the predetermined cluster pattern; and constructing a processed image having a plurality of indices using the respectively selected plurality of processed pixels.

Each processed pixel of the pluralities of processed pixels may comprise a respective array index with respect to the array of pixels.

The method may further comprise: constructing the processed image by arranging each processed pixel of the pluralities of processed pixels according to the respective array index.

It is thus possible to provide a method and apparatus that ameliorates a captured image where pixels of a thermal sensor array are not homogeneously distributed. The method and apparatus obviate or at least mitigate blurring present in a captured image.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
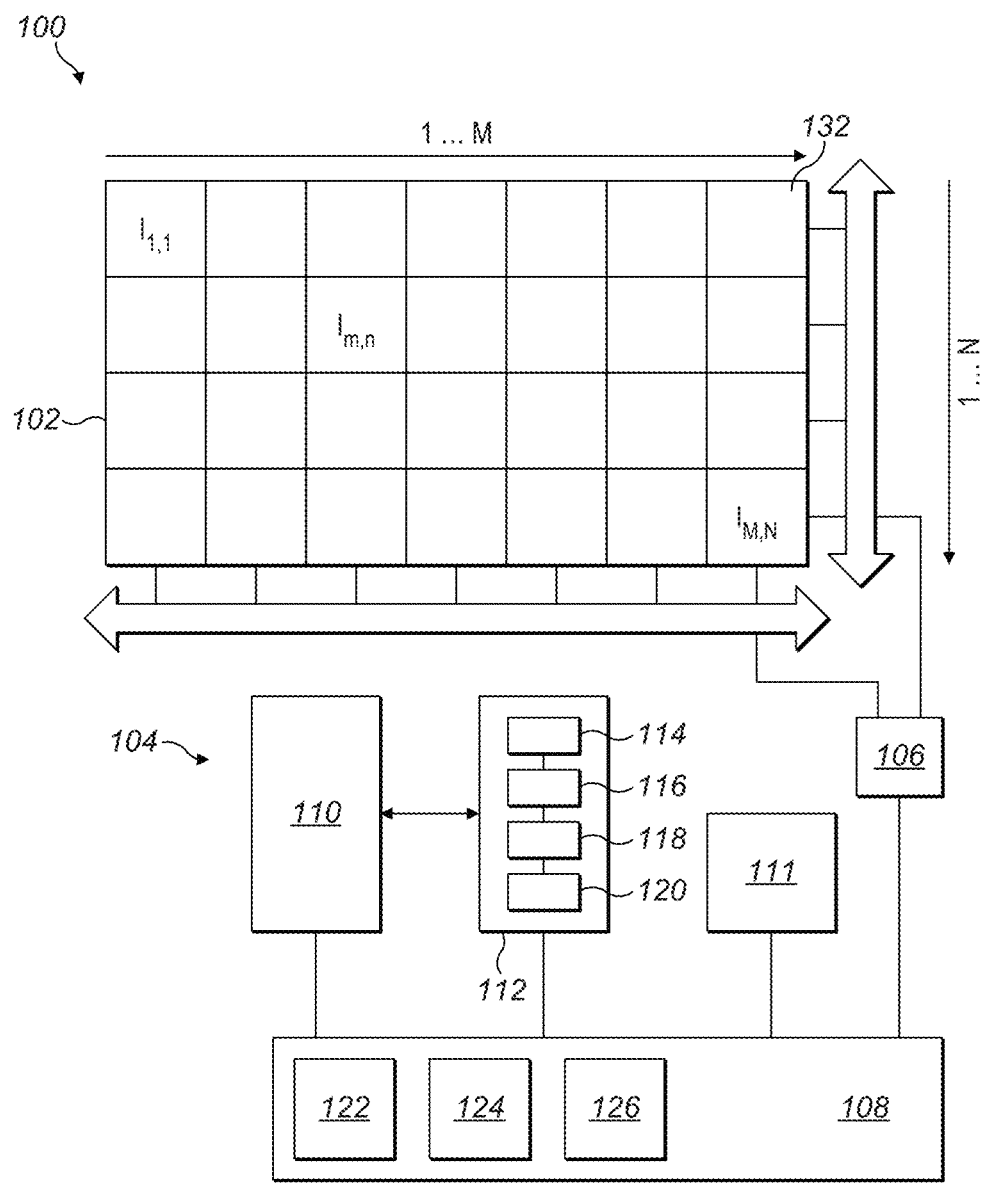
FIG. 1 is a schematic diagram of a thermal detector device constituting an embodiment of the invention.

Throughout the following description, identical reference numerals will be used to identify like parts.

Referring to FIG. 1, a thermal detector device 100 of a thermal imaging apparatus comprises an array of thermal sensing pixels 102 operably coupled to signal processing circuitry 104. In this example, the array of thermal sensing pixels 102 is arranged as a logical rectangular matrix of M columns of pixels and N rows of pixels. An example of a suitable array of thermal sensing pixels is the MLX90640 far infrared thermal sensor array available from Melexis Technologies, NV. The signal processing circuitry 104 comprises an image capture module 106 operably coupled to the array of thermal sensing pixels 102. As a description of the detail of the structure and/or operation of the image capture module 106 is not central to an understanding of this or other embodiments, for the sake of conciseness and simplicity of description, the image capture module 106 will not be described in further detail herein.

In this example, the signal processing circuitry 104 also comprises a data store, for example a memory 108, such as Random Access Memory (RAM) and/or non-volatile memory, a pixel combination unit 110, a deconvolution unit 111 and a degradation filter calculator 112. The image capture module 106 is operably coupled to the memory 108. Likewise, the pixel combination unit 110 and the degradation filter calculator 112 are operably coupled to the memory 108. The pixel combination unit 110, the deconvolution unit 111 and the degradation filter calculator 112 constitute parts of a processing resource. The degradation filter calculator 112 supports and thus comprises a neighbour selector 114, a distance calculator 116, an angle calculator 118 and an a lookup unit 120. In this example, the memory 108 is configured to store, inter alia, captured image data 122, intensity distribution model data 124, for example point spread function data, and degradation filter data 126 relating to a plurality of degradation filters. The intensity distribution model data 124 is generated, in this example by prior testing using a so-called black body point source to irradiate a test array of thermal sensing pixels (not shown) with electromagnetic radiation in the infrared range of the electromagnetic spectrum, the results (FIG. 5) being processed to provide model data that is stored in the memory 108 during manufacture of the thermal detector device 100. The point source is moved with time over a range of angles to record a detection signal of a pixel, constituting a notional pixel, of the test array with changes in angle of incidence. The intensity distribution model 170 upon which the intensity distribution model data is based is a normalised model that, in this example, spans an angular range of −90° and +90°. For simplicity, the intensity distribution model 170 is shown in one dimension. However, the skilled person should appreciate that intensity distribution model can be in respect of multiple orientations and hence dimensions. In this example, the intensity distribution model data 124 represents an average of the point spread functions of all the pixels of the array of thermal sensing pixels 102. Furthermore, although the above example employs the intensity distribution model data 124, the memory 108 can be configured to store a function that replicates the intensity distribution model 170 that can be used to calculate a normalised intensity during operation of the thermal detector device 100, i.e. on an "on the fly" basis. In other embodiments, the intensity distribution model 170 can model intensity or normalised intensity with distance as opposed to angle. The models described above can comprise data sufficient to determine intensities or normalised intensities in respect of a predetermined number of neighbouring pixels peripheral to the notional pixel, but not necessarily all neighbouring pixels of the test array of thermal sensing pixels.

Figure 2:
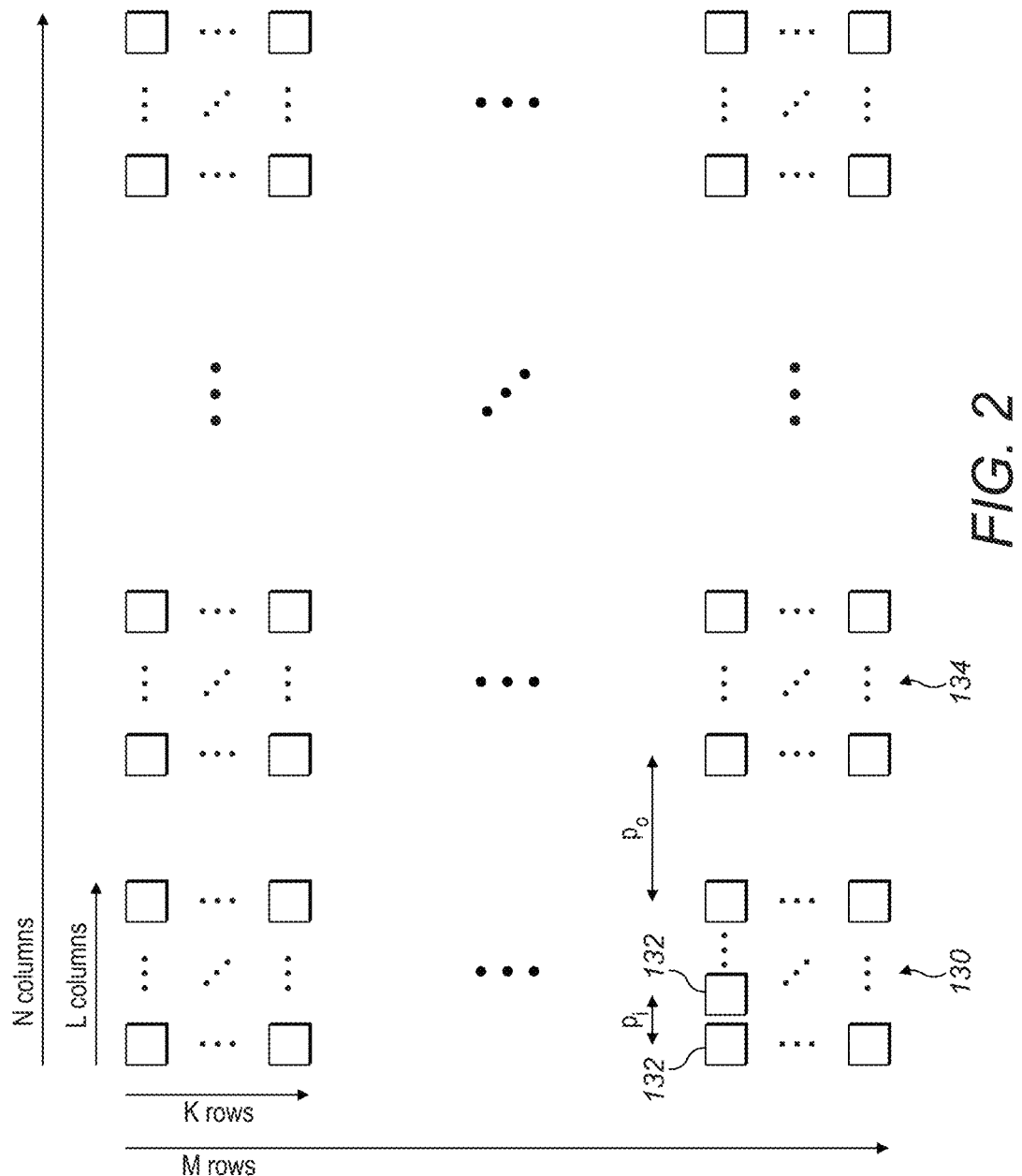
FIG. 2 is a schematic diagram of an array of sensing pixels of the apparatus of FIG. 1 in greater detail.

Turning to FIG. 2, although the array of thermal sensing pixels 102 is logically arranged as a uniform array, it has been recognised that, in practice, the array of thermal sensing pixels 102 comprises repeating clusters of pixels 130. In this example, each cluster of pixels is itself a sub-array of K×L pixels, where K is the number of rows and L is the number of columns. Furthermore, pixels 132 within a cluster have a first substantially consistent distance therebetween, constituting an intra-cluster distance, $p_i$, and neighbouring clusters 130, 134 are separated by a second substantially consistent distance, constituting an inter-cluster distance, $p_o$.

Figure 3:
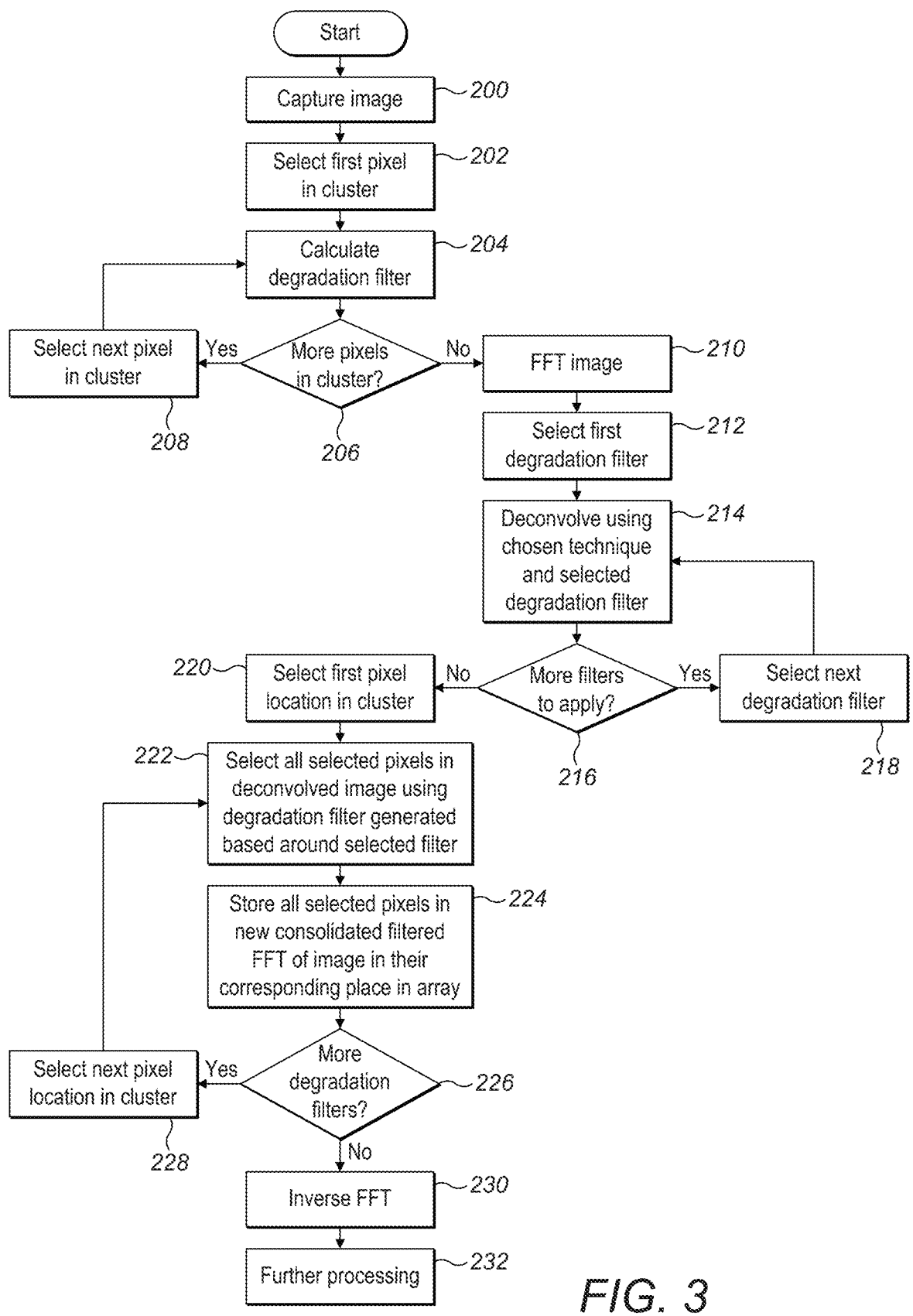
FIG. 3 is a flow diagram of a method of processing an image constituting another embodiment of the invention.
Figure 4:
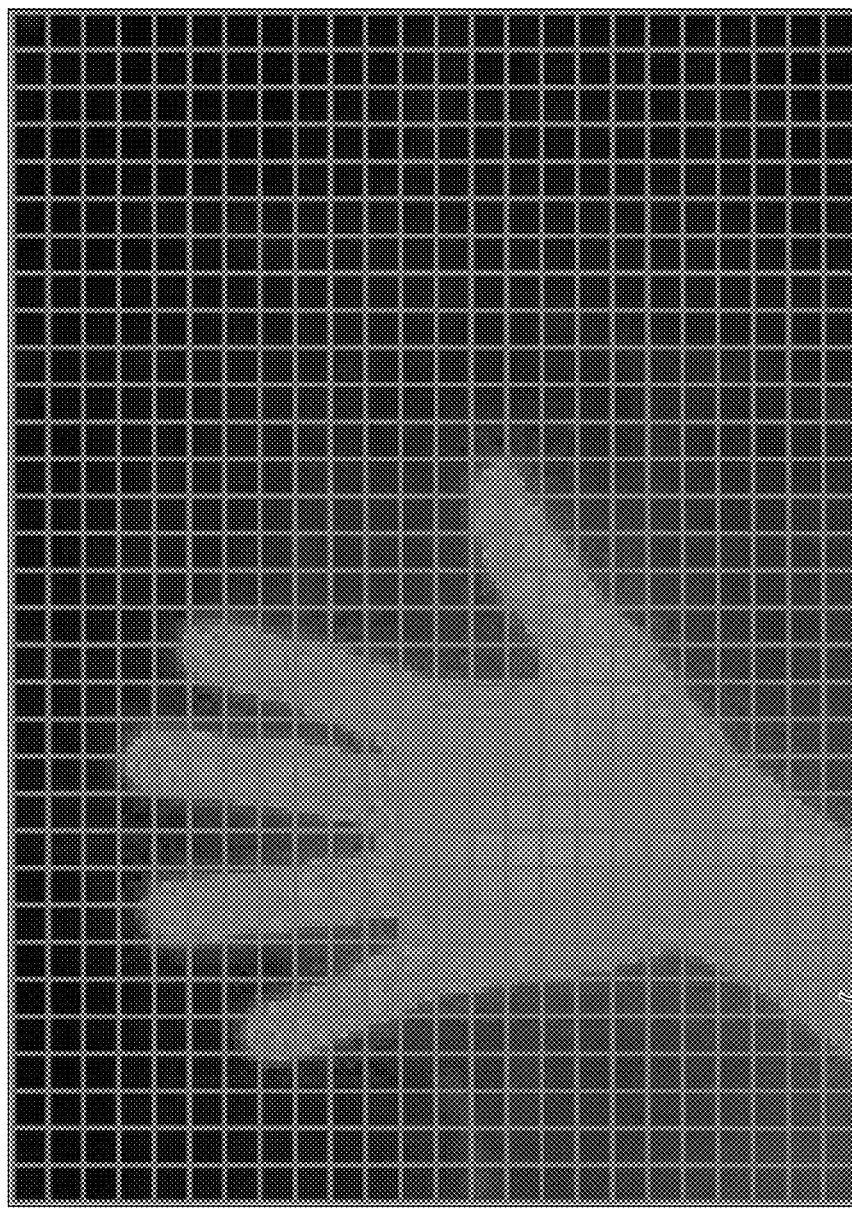
FIG. 4 is a schematic representation an exemplary image captured by the thermal detector device of FIG. 1.

In operation (FIG. 3), the thermal detector device 100 is operated in an environment where thermal images need to be captured. The thermal detector device 100 is oriented towards a scene in the environment and a thermal image 300 (FIG. 4) is captured (Step 200). Infrared electromagnetic radiation emitted or reflected by objects in the scene are received by the array of thermal sensing pixels 102 within a field of view of the thermal detector device 100. In this example, the thermal image 300 captured contains a thermal representation of an object 302, for example a hand of a person. As captured, blurring exists around at the periphery of the object 302, which requires amelioration.

The infrared electromagnetic radiation received by the array of thermal sensing pixels 102 is converted from the optical domain to the electrical domain. The image capture module 106 receives electrical signals from the array of thermal sensing pixels 102 representing raw intensity measurement data in respect of infrared electromagnetic radiation received by each pixel of the array of thermal sensing pixels 102. The raw intensity data received by the image capture module 106 is stored as the captured image data 122 in the memory 108. As mentioned above, the array of thermal sensing pixels 102 is arranged as an M×N matrix of pixels 118, and in this example the raw intensity data is stored in the memory 108 in a manner that is indexed by row and column of the array of thermal sensing pixels 102, for example $I_{m,n}$, where I is the intensity measured by the pixel in the $M^{th}$ column and $N^{th}$ row.

In order to process the captured image 300, a degradation filter, constituting a kernel, is to be generated and applied to the captured image data 122 using the a priori knowledge that in practice the array of thermal sensing pixels 102 is not uniformly distributed at an individual pixel level across the array of thermal sensing pixels 102, but instead is distributed uniformly at a cluster level, i.e. substantially identical clusters of pixels repeat throughout the array of thermal sensing pixels 102, and at a pixel level within each cluster, i.e. within each cluster, the individual pixels are uniformly distributed. In this example, each cluster of pixels has a predetermined cluster pattern, for example a 3 pixels×3 pixels pattern.

Figure 5:
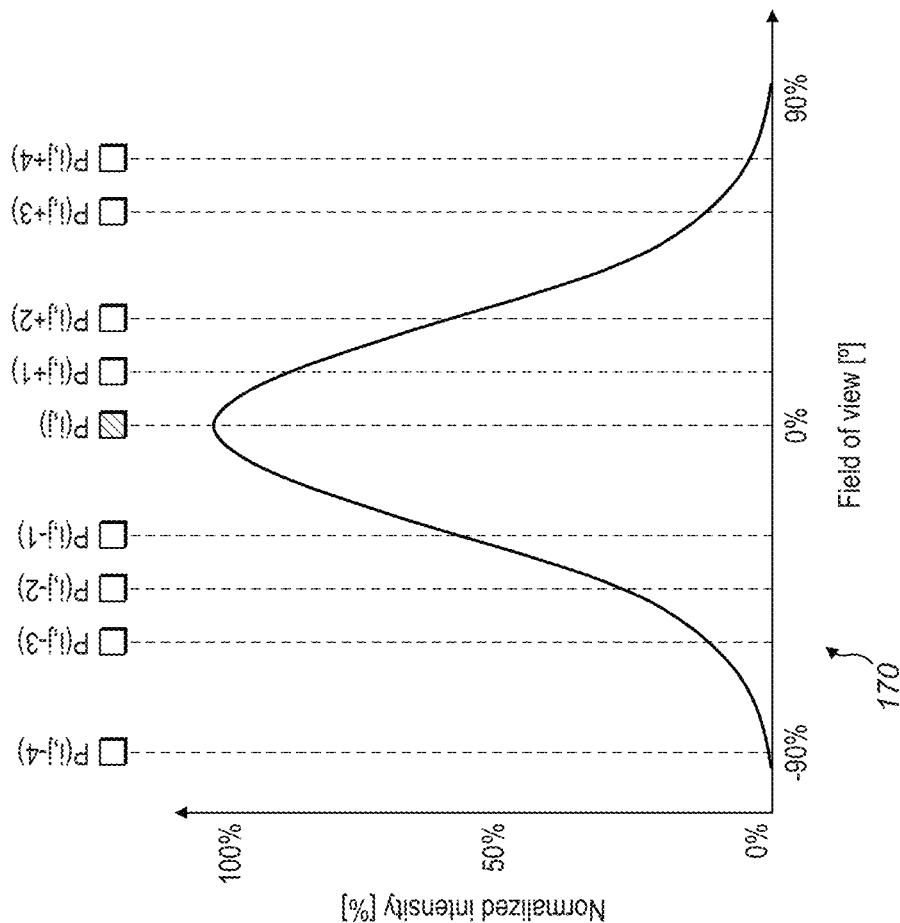
FIG. 5 is a schematic diagram of a normalised point spread function and a correspondence with a portion of the array of sensing pixels of FIG. 1.
Figure 5:
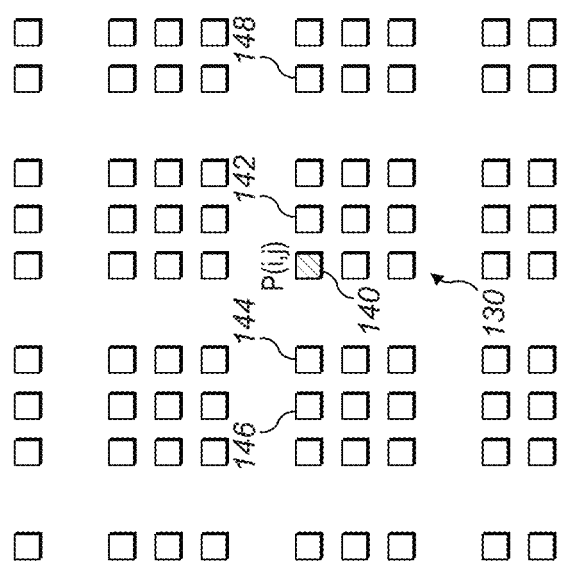
Figure 6:
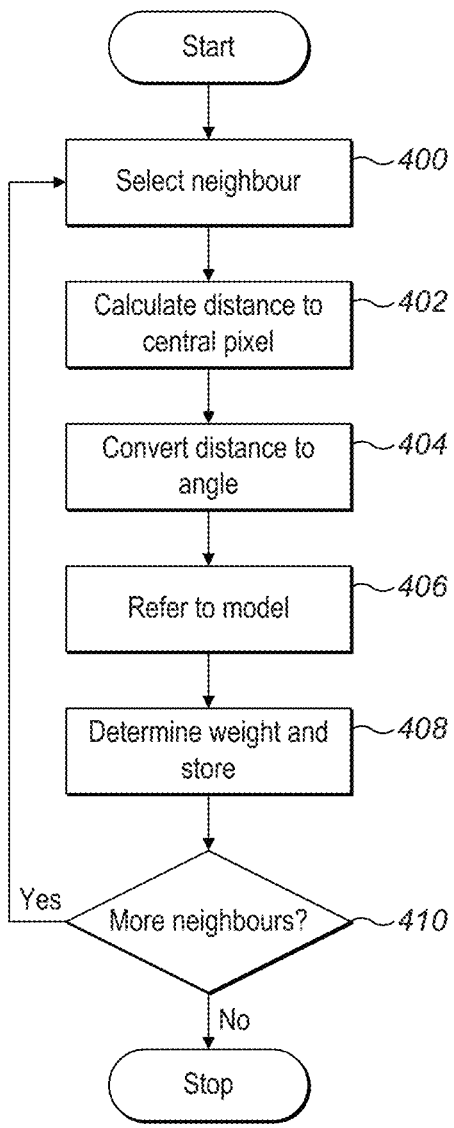
FIG. 6 is a flow diagram of a method of generating a degradation filter constituting a further embodiment of the invention.

Referring to FIG. 5, the degradation filter calculator 110 therefore selects a cluster 130 of pixels, which can be an arbitrary initial selection, and then selects (Step 202) a pixel to be filtered 140, and so an index thereof, from the cluster 130 and calculates (Step 204) the degradation filter for the selected pixel to be filtered 140 as follows. Turning to FIG. 6, once the pixel to be filtered 140 has been selected, the degradation filter calculator 110 selects (Step 400) a first neighbouring pixel 142 and identifies the selected pixel to the distance calculator 116, which calculates (Step 402) a distance between the selected pixel to be filtered 140 and the first neighbouring pixel 142. In this example, the pixel to be filtered 140 and the first neighbouring pixel 142 resides within the same cluster 130.

In this example, the distance between the pixel to be filtered 140 and the first neighbouring pixel 142 is $p_i$. Once the distance has been calculated, the distance calculator 116 provides the calculated distance to the angle calculator 118, which converts (Step 404) the calculated distance to an angle. In this regard, the relationship between the angle and pixel distance is given by the following linear expression:

$$\text{angle} = a \times (\text{distance\_between\_pixels}) + b \qquad (1)$$

where a and b are constants.

Using the angle calculated, a weight is calculated in respect of the first neighbouring pixel 142 and which is also associated with the distance between the pixel to be filtered 140 and the first neighbouring pixel 142. In this example, weights are obtained by reference to the normalised Point Spread Function model 170, which is stored, in this example, as the model data 124 in the memory 108. The normalised intensity of light of the model 170 therefore provides an estimate of the "leakage" of light to neighbouring pixels. By relating distances between pixels with angles, the model 170 can be used to obtain the weights required to generate the degradation filter in order to minimise the influence of measurements made by a neighbouring pixel on the pixel to be filtered 140. In this respect, the weight obtained from the model 170 can be applied, through the degradation filter, to the neighbouring pixel in order to minimise such influence mentioned above. The lookup unit 120 therefore accesses (Step 406) the model data 124 using the angle calculated by the angle calculator 118 and obtains a normalised intensity value, constituting the weight, corresponding to the angle calculated and stores (Step 408) the weight obtained as part of the degradation filter data 126 in the memory 108. The weight stored is one value of the overall degradation filter for the pixel to be filtered 140. In this example, the degradation filter is a 9×9 matrix of values. However, the skilled person will appreciate that other matrix dimensions for the degradation filter can be employed.

Once the weight has been determined, the degradation filter calculator 112 determines (Step 410) whether further weights need to be calculated to complete the generation of the degradation filter for the pixel to be filtered 140. In this example, as the degradation filter is the 9×9 matrix, further weights need to be calculated for other neighbouring pixels 144, 146, 148 corresponding to the entries in the 9×9 degradation filter and so another neighbouring pixel 144 is selected and the above process (Steps 400 to 410) is repeated until weights for all neighbouring pixels corresponding to the 9×9 matrix entries in the degradation filter have been determined. For the sake of clarity of description, taking a row of pixels as an example, including the pixel to be filtered 140, the distances between the pixel to be filtered 140 and the respective neighbouring pixels are as set out in Table 1 below.

TABLE 1

| Pixel | Distance |
| --- | --- |
| P(i, j − 4) | $2p_o + 2p_i$ |
| P(i, j − 3) | $p_o + 2p_i$ |
| P(i, j − 2) | $p_o + p_i$ |
| P(i, j − 1) | $p_o$ |
| P(i, j): | 0 |
| P(i, j + 1) | $p_i$ |
| P(i, j + 2) | $2p_i$ |
| P(i, j + 3) | $2p_i + p_o$ |
| P(i, j + 4) | $3p_i + p_o$ |

In Table 1, P(i,j) algebraically represents the location of the pixel to be filtered 140, having row and column coordinates, i and j, respectively. The neighbouring pixels are identified by indices expressed in terms of offsets relative to the pixel to be filtered P(i,j) 140, for example P(i,j+3), which represents the position of the third neighbouring pixel 148 to the right of the pixel to be filtered 140. Similarly, an expanded table to Table 1 can be constructed to cover the different rows of pixels relative to the pixel to be filtered within the context of the 9×9 matrix. Table 1 is illustrative of the fact that the distance between one pixel neighbouring the pixel to be filtered 140 and the pixel to be filtered 140 can comprise the intra-cluster distance, $p_i$, or the inter-cluster distance, $p_o$, or a combination thereof. Likewise, another pixel neighbouring the pixel to be filtered 140 and the pixel to be filtered 140 can comprise the intra-cluster distance, $p_i$, or the inter-cluster distance, $p_o$, or a combination thereof. In this regard, the distance between the pixel to be filtered 140 or indeed the notional pixel of the model 170, and a given neighbouring pixel can be expressed as follows:

$$\text{distance\_between\_pixels} = c \times p_o + d \times p_i \qquad (2)$$

where distance-between_pixels is the distance between pixels in equation (1), $p_o$ is an inter-cluster distance, $p_i$ an intra-cluster distance, and c and d are constants. Of course, if diagonal distances are to be taken into account, equation (2) above has to be appropriately adapted to accommodate the diagonal geometry.

Referring back to FIG. 3, once weights have been calculated in respect of the pixel to be filtered 140 for the degradation filter corresponding to the pixel to be filtered 140, the degradation filter calculator 112 determines (Step 206) whether more degradation filters need to be calculated in respect of the cluster 130. In the event that the degradation filter calculator 112 determines that further degradation filters need to be calculated, the degradation filter calculator 112 selects (Step 208) another pixel from the cluster to serve as the pixel to be filtered for which a degradation filter has not been calculated and the degradation filter calculator 112 calculates (Step 204) the degradation filter for the newly selected pixel and the process of FIG. 6 (Steps 400 to 410) is repeated using the newly selected pixel as the pixel to be filtered. The process of selecting pixels from the cluster and generating degradation filters for the pixels selected (Steps 204 to 208) is repeated until a plurality of degradation filters is stored in the memory 108, one in respect of each pixel of the cluster 130.

Thereafter, the deconvolution unit 111 then performs a deconvolution process on the captured image 300, in particular the captured image data 122, in order to ameliorate the blurring mentioned above. In this regard, the deconvolution process can employ any suitable deconvolution algorithm, for example an inverse filter, a Wiener filter, or a Constrained Least Square algorithm. In this example, the deconvolution process comprises employing the Weiner filter. In this regard, as an initial step, the deconvolution unit 111 performs (Step 210) a Fast Fourier Transform (FFT) on the captured image 300, in particular in this example the captured image data 122. The deconvolution unit 111 then selects (Step 212) a first degradation filter of the plurality of degradation filters and calculates the Wiener filter using the first degradation filter selected. Using the Wiener filter calculated, the deconvolution unit 111 then applies (Step 214) the Weiner filter calculated, based upon the selected first degradation filter, to the Fourier transform of the captured image data 122, i.e. in respect of all pixels or substantially all pixels of the array of the thermal sensing pixels 102, thereby deconvolving the captured image data 122. The first deconvolved image data is stored in the memory 108 for future use and corresponds to the index of the pixel to be filtered 140 selected from the cluster 130 and upon which the first degradation filter is based.

The deconvolution unit 111 then determines (Step 216) whether further degradation filters need to be applied in respect of the plurality of degradation filters 126 stored in the memory 108. In this regard, if deconvolution using degradation filters in respect of other pixel indices of the cluster 130 has not been performed, the deconvolution unit 111 selects another pixel from the cluster having a corresponding degradation filter that has not been hitherto applied. The deconvolution unit 111 therefore selects (Step 218) the corresponding degradation filter and repeats the above process (Step 214) of applying another Wiener filter calculated using the newly selected degradation filter to the Fourier transform of the captured image data 122 in order to generate second deconvolved image data, which is also stored in the memory 108 for further use. Again, the second deconvolved image data corresponds to the index of the newly selected pixel from the cluster 130 to be filtered and upon which the newly selected degradation filter is based. This process (Steps 214 to 218) is repeated until deconvolved image data has been generated and stored in the memory 108 for each of the pixel indices of the cluster 130, i.e. by applying each of the plurality of degradation filters.

The stored deconvolved image data stored in the memory 108 is then accessed and processed by the filtered pixel combination unit 110 in the following manner. The filtered pixel combination unit 110 selects (Step 220) a first pixel location or index within the cluster and accesses the first deconvolved image data corresponding to the first pixel location selected. From the first deconvolved image data, the filtered pixel combination unit 110 selects (Step 222) deconvolved image data from pixels in the first deconvolved image located at the first pixel location in the respective clusters of the M×N array of pixels. For example, where location 1 of 9 (of the 3×3 clusters) is selected, the deconvolved image data corresponding to location 1 for each cluster with respect to the first deconvolved image data are selected. Once selected, the selected deconvolved data is stored (Step 224) in the memory 108 as part of a combination deconvolved image, the selected data being stored so as to map to the corresponding pixel locations of the array of thermal sensing pixels 102, for example the respective coordinates of the first location of each cluster in the array of thermal sensing pixels 102. All other data from the first deconvolved image data is disregarded.

The filtered pixel combination unit 110 then determines (Step 226) whether deconvolved pixels from other, previously generated, deconvolved image data needs to be extracted to complete generation of the combination deconvolved image. In the event that further pixels need to be extracted from the other deconvolved image data stored in the memory 108 relating to application of other degradation filters, another pixel location within the clusters is selected (Step 228) and the above-described process (Steps 222 to 226) is repeated in order to populate corresponding locations within clusters of the combined deconvolved image. For example, if location 2 is selected and location 2 corresponds to second deconvolved image data generated, all location 2 pixel data in the second deconvolved image data are selected and stored in corresponding location 2s in the combined deconvolved image. All other data from the second deconvolved image data is disregarded. Once processing in respect of no further locations in clusters is required, for example when processing in respect of all cluster locations is complete, the deconvolution unit 111 accesses the combined deconvolved image data and performs (Step 230) an inverse FFT on the combined deconvolved image data, yielding ameliorated image data that is stored in the memory 108 and can be used by other functional units of the signal processing circuitry (not shown) to perform (Step 232) other processing functions on the ameliorated image data, for example, but not exclusively de-interlacing.

The skilled person should appreciate that the above-described implementations are merely examples of the various implementations that are conceivable within the scope of the appended claims. Indeed, it should be appreciated that although the examples set forth herein describe square matrices for the degradation filters, it should be appreciated that other patterns can be employed, for example a hexagonal data structure.

It should be appreciated that references herein to "infrared", other than where expressly stated otherwise, are intended as references to electromagnetic energy having wavelengths in the range of 700 nm to 1 mm, such as 760 nm to 1 mm or 700 nm to 1500 nm, which includes electromagnetic radiation in the near infrared region, the middle infrared region and the far infrared region.

What is claimed is:

1. A method of digitally processing an image captured using an array of sensing pixels of a detector device, the method comprising:
generating an intensity distribution model in respect of at least a portion of the array of sensing pixels;
selecting a pixel from the array of sensing pixels, the array of sensing pixels comprising clusters of pixels;
determining a first distance from the selected pixel to a first neighboring pixel and using the intensity distribution model referenced by the first distance to calculate a first weight to apply to the first neighboring pixel;
determining a second distance from the selected pixel to a second neighboring pixel and using the intensity distribution model referenced by the second distance to calculate a second weight to apply to the second neighboring pixel; wherein the first distance comprises an intra-cluster distance and the second distance comprises an inter-cluster distance, the intra-cluster distance being different from the inter-cluster distance;
applying the first weight to the first neighboring pixel; and
applying the second weight to the second neighboring pixel.

2. The method according to claim 1, wherein
the intensity distribution model models variation of intensity with angle of incidence with respect to a notional pixel; and the method further comprises:
translating the first distance to a first corresponding angle of incidence; and
determining a first intensity from the intensity distribution model using the first corresponding angle of incidence.

3. The method according to claim 2, further comprising:
translating the second distance to a second corresponding angle of incidence; and
determining a second intensity from the intensity distribution model using the second corresponding angle of incidence.

4. The method according to claim 1, wherein the intensity distribution model models variation of intensity with an angle of incidence with respect to a notional pixel.

5. The method according to claim 4, wherein the angle of incidence is linearly related to a distance from a peak of the intensity distribution model.

6. The method according to claim 4, wherein a distance between the notional pixel and a neighboring pixel is:

$$c \times p_o + d \times p_i,$$

where $p_o$ is an inter-cluster distance and $p_i$ is an intra-cluster distance, and c and d are constants.

7. The method according to claim 1, wherein the intensity distribution model models variation of intensity with distance.

8. The method according to claim 1, wherein the intensity distribution model in respect of the at least a portion of the array of sensing pixels is in respect of a notional pixel and a predetermined number of pixels peripheral to the notional pixel.

9. The method according to claim 1, wherein the intensity distribution model comprises normalized intensity values.

10. The method according to claim 1, further comprising:
generating a kernel using the first weight and the second weight.

11. The method according to claim 10, further comprising:
deconvolving a pixel of the array of pixels with the kernel.

12. The method according to claim 10, further comprising:
generating another kernel using different weights; and
deconvolving another pixel of the array of pixels using the another kernel.

13. The method according to claim 1, further comprising:
generating a set of kernels, each kernel of the set of kernels respectively corresponding to a different pixel index of a predetermined cluster pattern of pixels in the array of sensing pixels, the predetermined cluster pattern repeating throughout the array of sensing pixels;
separately applying each kernel of the set of kernels as a deconvolution filter to the captured image to yield a set of deconvolved images, respectively corresponding to each pixel index of the predetermined cluster pattern;
selecting a plurality of processed pixels respectively from each deconvolved image of the set of deconvolved images, each plurality of the plurality of processed pixels selected respectively corresponding to the each pixel index of the predetermined cluster pattern; and
constructing a processed image having a plurality of indices using the respectively selected plurality of processed pixels.

14. The method according to claim 13, wherein each processed pixel of the pluralities of processed pixels comprises a respective array index with respect to the array of pixels.

15. The method according to claim 14, further comprising:
constructing the processed image by arranging each processed pixel of the pluralities of processed pixels according to the respective array index.

* * * * *